(12) United States Patent
Saberan et al.

(10) Patent No.: US 6,899,392 B1
(45) Date of Patent: May 31, 2005

(54) STADIUM SLIDE SEAT

(75) Inventors: Mohammad Saberan, New Baltimore, MI (US); Kyle Calvert, Warren, MI (US)

(73) Assignee: Lear Corporation, Southfield, MI (US)

( * ) Notice: Subject to any disclaimer, the term of this patent is extended or adjusted under 35 U.S.C. 154(b) by 7 days.

(21) Appl. No.: 10/700,823

(22) Filed: Nov. 4, 2003

Related U.S. Application Data

(60) Provisional application No. 60/516,465, filed on Oct. 31, 2003.

(51) Int. Cl.$^7$ ............................................... B60N 2/00
(52) U.S. Cl. .................................... 297/334; 297/317
(58) Field of Search .................... 296/65.16, 65.09, 296/65.05; 297/378.1, 378.12, 383, 344.1, 297/354.13, 334–336, 331, 340, 316–318, 297/320–322

(56) References Cited

U.S. PATENT DOCUMENTS

| | | | | |
|---|---|---|---|---|
| 4,382,629 A | * | 5/1983 | Froumajou | ................... 297/322 |
| 5,195,802 A | * | 3/1993 | Hayakawa et al. | ......... 297/335 |
| 5,951,104 A | * | 9/1999 | Tsuchiya et al. | ............ 297/316 |
| 6,089,641 A | * | 7/2000 | Mattarella et al. | ............ 296/64 |
| 6,196,613 B1 | * | 3/2001 | Arai | ........................ 296/65.13 |
| 6,371,556 B1 | * | 4/2002 | Arai | ........................... 297/331 |
| 6,568,736 B2 | * | 5/2003 | Jach et al. | ............... 296/65.09 |
| 6,655,738 B2 | * | 12/2003 | Kämmerer | ................... 297/331 |
| 6,676,216 B1 | * | 1/2004 | Freijy et al. | ................. 297/335 |
| 6,679,536 B1 | * | 1/2004 | Sonnenberg et al. | ...... 296/65.09 |
| 6,688,666 B2 | * | 2/2004 | Neale et al. | ............. 296/65.09 |

* cited by examiner

*Primary Examiner*—Milton Nelson, Jr.
(74) *Attorney, Agent, or Firm*—Bill C. Panagos

(57) ABSTRACT

A vehicle seat for a vehicle. The seat moveable into a stadium position in which a seat cushion assembly and a seat back assembly are substantially upright. The seat can also include incline and recline features which allow the seat back to fold forward to kneel on the seat cushion and to recline backward to a flat position. The stadium positioning provides, amongst other benefits, easier access to an area behind the seat.

18 Claims, 4 Drawing Sheets

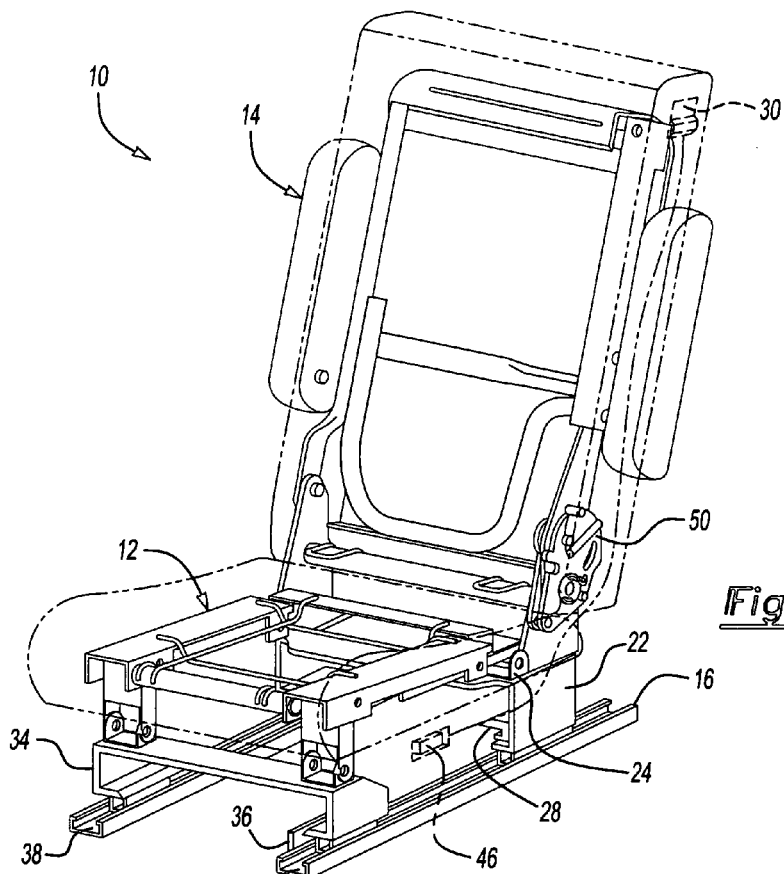
Fig-1
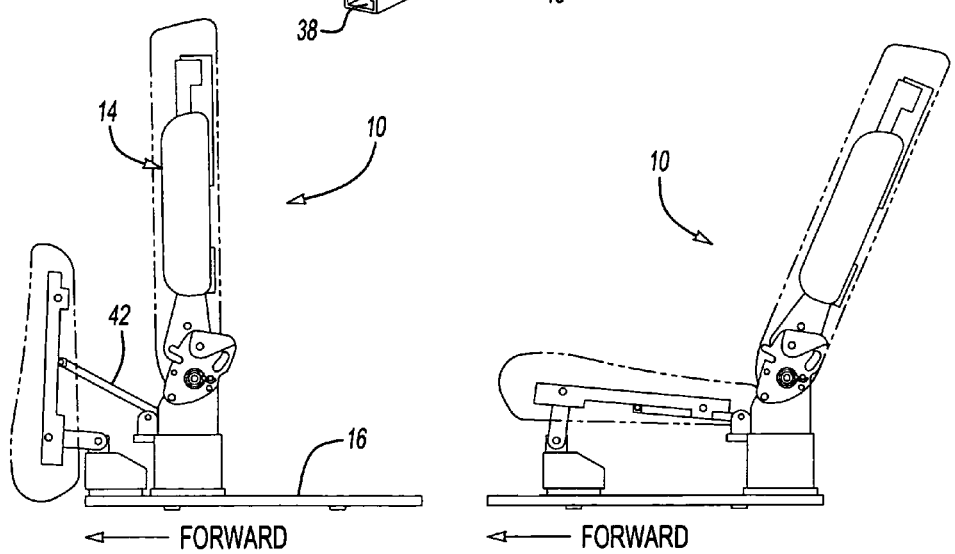
Fig-2
Fig-3

← FORWARD

← FORWARD

STADIUM SLIDE SEAT

CROSS-REFERENCE TO RELATED APPLICATIONS

This application claims the benefit of U.S. provisional application Ser. No. 60/516,465 filed Oct. 31, 2003.

BACKGROUND OF THE INVENTION

1. Field of the Invention

The present invention relates to moveable vehicle seating.

2. Background Art

Minivans and a sport utility vehicle (SUV) include a second row of passenger seats behind a front row of seats used for the driver and the front seat passenger. A benefit of these vehicles is the cargo area behind this second row of seats.

A user can access the cargo area through the second row passenger area by moving one of the seats in the second row. When accessing the cargo area from the second row of seats, it is desirable to make doing so as easy as possible. Accordingly, there exists a need to provide a seating system which provides easy access to the cargo area.

SUMMARY OF THE INVENTION

It is, therefore, an object of the present invention to provide easy access to a vehicle area behind a second row seat.

One aspect of the present invention relates to a second row seat system for use with an automotive vehicle to provide easy access to the area of the vehicle behind a second row seat. The seat system includes a seat cushion assembly, a seat back assembly, and a track assembly. The system is operable to provide stadium positioning of the seat cushion assembly and the seat back assembly. The stadium positioning corresponds with the seat cushion assembly and the seat back assembly being in a substantially upright position, generally at a forward position of the track assembly. In this position, a user is provided with easy access to the vehicle area behind the second row seat.

The track assembly preferably permits the seat back assembly to slide forward to cause the seat cushion assembly to move into the substantially upright position. The track assembly can include a bottom track portion, a front top track portion, and a rear top track portion. The top track portions preferably are slidable along the bottom track portion to permit forward and rearward movement. The seat cushion assembly can be connected to the front top track portion and the seat back assembly can be connected to the rear top track portion for movement along the bottom track portion.

A linkage can be connected to the rear top track portion and the seat cushion assembly. The linkage preferably causes the seat cushion assembly to pivot relative to the front top track portion and into the substantially upright position when the rear top track portion is slid forward.

A forward/rearward assembly can permit forward and rearward movement of the seat. The forward movement can include the front and rear top track portions simultaneously moving forward along the bottom track portion. The rearward movement can include the front and rear top track portions simultaneously moving rearward along the bottom track portion.

A pivot assembly can pivot the seat back assembly relative to the rear top track portion. The pivot assembly can be operable to secure the seat back in a kneeling position, an inclined position, a flat position, and a reclined position. The kneeling position can include the seat back being pivoted forwardly to a position substantially horizontal relative to the seat cushion. The inclined position can include the seat back being pivoted forwardly to an inclined position which is less than the kneeling position. The flat position can include the seat back being pivoted rearwardly to a position substantially horizontal relative to the seat cushion. The reclined position can include the seat back being pivoted rearwardly to reclined position which is less that the flat position.

A stadium slide assembly can permit stadium positioning of the seat. Actuation of the stadium slide assembly can permit forward movement of the front and rear top track portions. The bottom track portion can include a stopper to limit forward movement of the front top track portion. The linkage preferably causes the seat cushion assembly to begin pivoting only after continued forward movement of the rear top track portion after the front top track portion contacts the stopper.

A spring can be secured at one end to the front top track portion and secured at another end to a front of the bottom track portion. The spring preferably tends to pull the front top track portion toward the front of the bottom track portion. In response to actuation of the stadium slide assembly for moving the seat into stadium positioning, the spring can provide initial biasing to move the rear top track portion forward. In response actuation of the stadium slide assembly for moving the seat from stadium positioning to seated positioning, the spring can restrain the front top track portion in a forward position relative to the stopper such that rearward movement of the rear top track portion causes the linkage to pivot the seat cushion from the substantially upright position to a seated position.

A seat cushion lock and a rear top track portion lock can be used to lock the seat cushion and the rear top track portion. The seat cushion lock can lock the seat cushion in the use position. The rear top track portion lock can lock the rear top track portion to the bottom track portion for locking the seat back assembly, and thereby the seat cushion in the substantially upright position, if the rear top track portion is moved sufficiently forward and locked.

BRIEF DESCRIPTION OF THE DRAWINGS

FIG. 1 illustrates a stadium seat in a use position in accordance with the present invention;

FIG. 2 illustrates a side-profile of the stadium seat in a stadium position in accordance with the present invention;

FIG. 3 illustrates a side-profile of the stadium seat in the use position in accordance with the present invention;

DETAILED DESCRIPTION OF THE PREFERRED EMBODIMENT(S)

Figure 4:
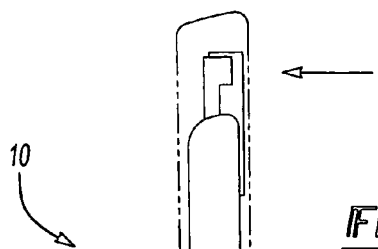
FIG. 4 illustrates a side-profile of the stadium seat in a forward position in accordance with the present invention.

FIG. 1 illustrates stadium seat 10 in a use position. The use position relates to seat cushion assembly 12 being in a substantially horizontal position commonly used to receive a passenger. Stadium seat 10 is preferably used as a second or third row seat in a minivan or sport utility vehicle (SUV) to permit easy access to an area behind seat 10. The present invention, however, is not limited to this use of stadium seat 10. Rather, the present invention is generally application to any vehicle environment where it is desirable to provide stadium seating.

FIG. 2 illustrates a side-profile of stadium seat 10 in a stadium position. The stadium position relates to a substantially upright positioning of seat cushion 12 and seat back assembly 14. Preferably, the stadium position also includes moving seat cushion assembling and seat back assembly 14 to a forward position of bottom track 16. The stadium position compacts seat 10 and preferably moves it forward. As described below, seat 10 is also easily moveable between the stadium position and the use position. In particular, a user can even reach in from outside the vehicle to move seat 10 between the stadium position and the use position.

Figure 5:
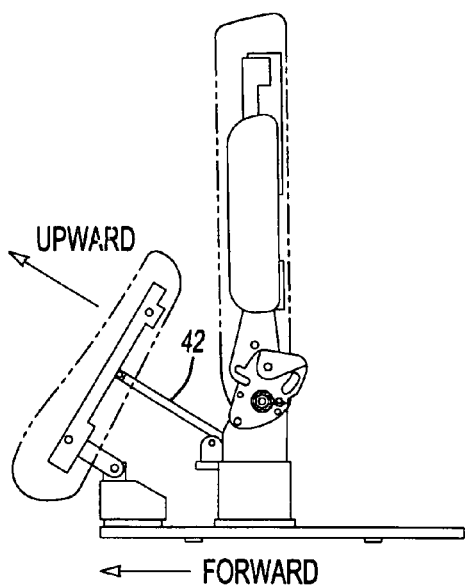
FIG. 5 illustrates a side-profile of the stadium seat in an intermediate position in accordance with the present invention.

FIGS. 3–5 illustrate the general motion of seat 10 during a transition from the user position (FIG. 3) to a forward position (FIG. 4) where front top track portion 34 abuts stopper 38, to an intermediate position where seat cushion assembly 12 begins to pivot upwardly (FIG. 5), to the stadium position (FIG. 2).

Figure 6:
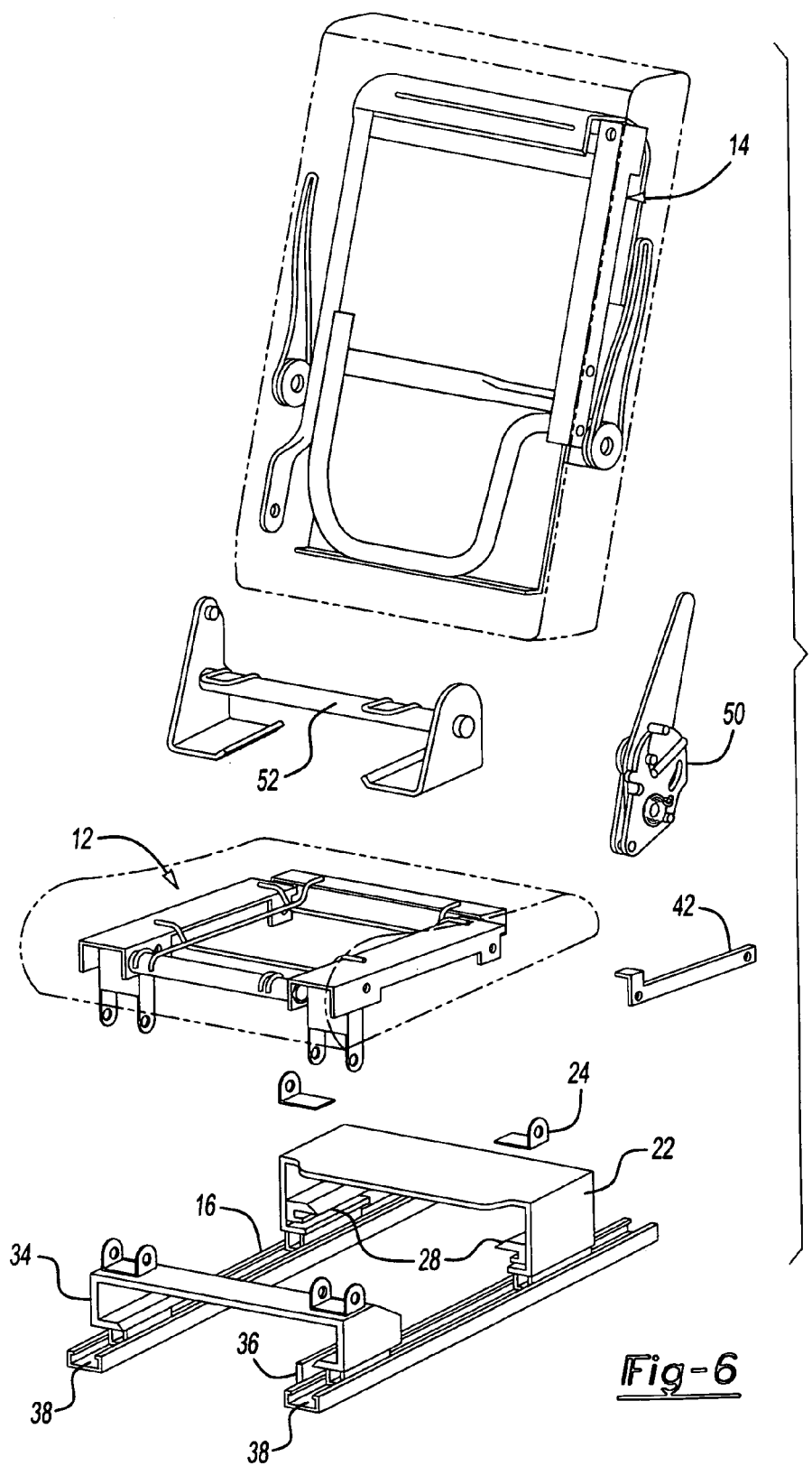
FIG. 6 illustrates an exploded view of a number of components which can be included with the stadium seat in accordance with the present invention.

FIG. 6 illustrates a number of the components which can comprise stadium seat 10. As one of ordinary skill in the art will appreciated, these components are merely an exemplary illustration of some components which may be used to provide stadium seating in accordance with the present invention. More or less components could be used without deviating from the scope and contemplation of the present invention. In the use position, seat cushion assembly 12 is locked to rear top track portion 22 by seat cushion lock 24 and rear top track portion 22 is locked to bottom track 16 by rear top track lock 28. Actuation of stadium slide assembly 30 causes a cable connected thereto to unlock rear top track lock 28 and to unlock seat cushion lock 24. The unlocked locks 24 and 28 permit slidable movement of front top track portion 34 and rear top track portion 22.

Preferably, spring 36 provides initial biasing of the front top track portion 34 to the forward portion shown in FIG. 4. This biasing tends to pull seat 10 to a front of bottom track 16 (toward front facing direction of seat). In detail, actuation of stadium slide assembly 30 from the use position, permits spring 36 to pull front top track portion toward stopper 38 and thereby the entire seat 10.

FIG. 5 illustrates the intermediate positioning for seat 10 after front top track portion 34 abuts stopper 38 as seat 10 slides from the forward position (FIG. 4) to the stadium position (FIG. 2). After front top track portion 34 abuts stopper 38, additional force is needed to continue forward movement of rear top track portion 22. The additional force can be provided by a user or other actuation means, such as an electromechanical device.

FIG. 5 illustrates seat cushion assembly 12 as it begins to pivot upwardly and forwardly with continued forward movement of rear top track portion 34. This is due to rear top track portion 22 causing linkage 42 to push on seat cushion assembly 12 after front top track portion 34 abuts stopper 38. The forward pivoting is continued until seat cushion assembly 12 is substantially upright. Typically, this occurs once seat back assembly 14 is moved forward proximate the front of bottom track 16. Stadium slide assembly 30 can then be released, which causes rear top track portion lock 28 to lock rear top track portion 22 in the forward position. This locks seat cushion assembly 12 and seat back assembly 14 in the substantially upright position.

To return from the stadium position to the use position, stadium slide assembly 30 is actuated to release rear top track portion lock 28. The seat back assembly 14 can then be slid rearward. Spring 36 retrains front top track portion 34 during the rearward movement of seat back assembly 14 to cause linkage 42 to pivot seat cushion assembly in a downwardly and rearwardly direction toward the use position. Stadium slide assembly 30 is then released to lock seat cushion lock 24 and to lock rear top track portion lock 28, which together lock seat cushion assembly 12 and seat back assembly 14 in position.

Forward/rearward assembly 46 is actuated to move seat forwardly and rearwardly. FIG. 4 illustrates the forward position. From the use position, actuation of assembly 46 unlocks rear top track portion lock 28. Spring 36 pulls front top track position 34 forward if actuation occurs when seat 10 is at a back of bottom track 16, and spring 36 opposes rear movement of seat 10 if actuation occurs when seat 10 is at the front of bottom track 16. Preferably, seat 10 is operable to move at least 100 mm.

Figure 7:
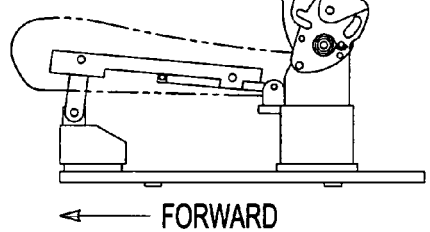
FIG. 7 illustrates a kneeling position of the stadium seat in accordance with the present invention.
Figure 8:
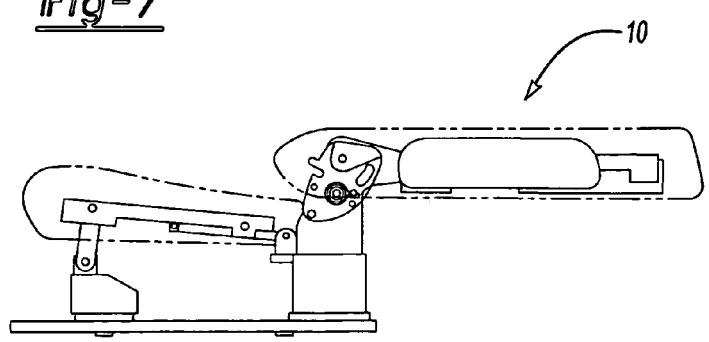
FIG. 8 illustrates a flat position of the stadium seat in accordance with the present invention.

Pivot assembly 50 is connected to pivot member 52 to incline or decline seat back assembly 14. Pivot assembly 50 can pivot seat back assembly 14 relative to rear top track portion 22. Pivot assembly 50 can be operable to secure seat back 14 in a kneeling position, an inclined position, a flat position, and a reclined position. FIG. 7 illustrates the kneeling position. The kneeling position can include seat back assembly 14 being pivoted forwardly to a position substantially horizontal relative to seat cushion assembly 12. The inclined position can include seat back assembly 14 being pivoted forwardly to an inclined position which is less than the kneeling position. FIG. 8 illustrates the flat position. The flat position can include seat back assembly 14 being pivoted rearwardly to a position substantially horizontal relative to seat cushion assembly 12. The reclined position can include seat back assembly 14 being pivoted rearwardly to a reclined position which is less that the flat position.

Figure 9:
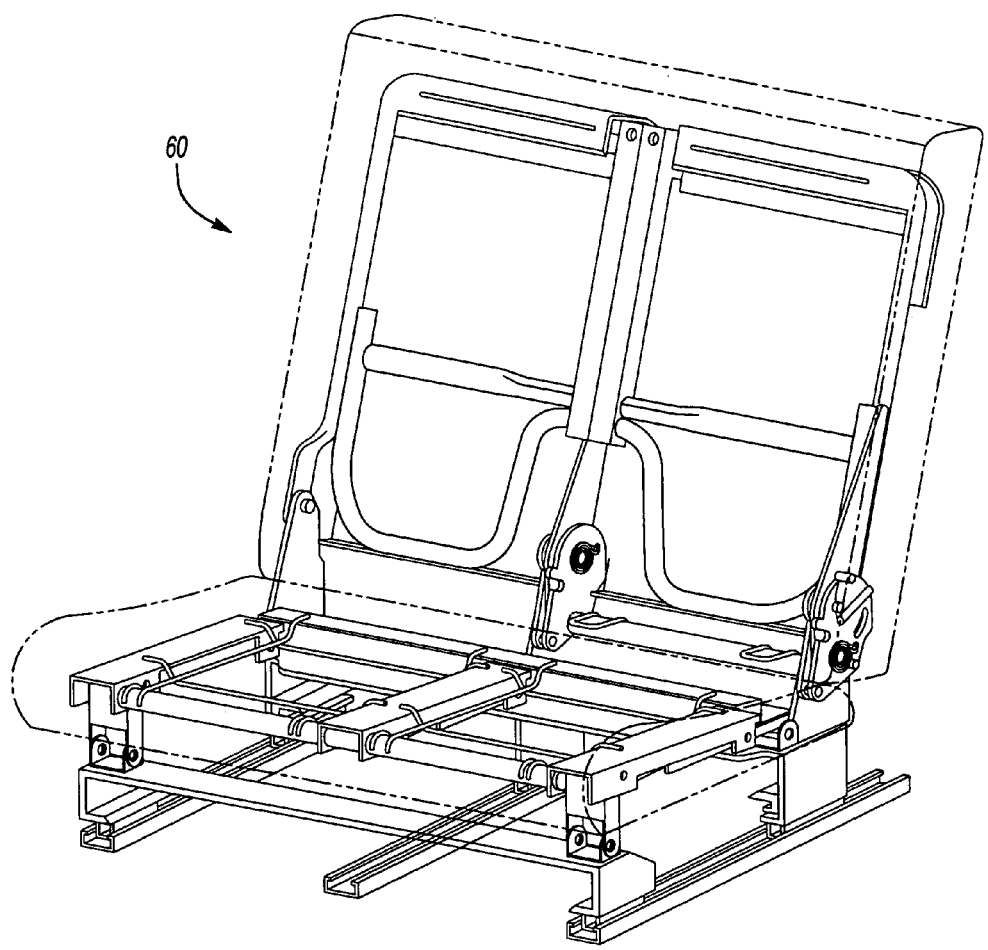
FIG. 9 illustrates a dual capacity stadium seat in accordance with the present invention.

FIG. 9 illustrates dual capacity stadium seat 60. Seat 60 operates in accordance with the foregoing operation of seat 10. Seat 60 preferably accommodates two passengers, or more.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat, the seat comprising:
   a seat cushion assembly;
   a seat back assembly;
   a track assembly for supporting the seat cushion assembly and the seat back assembly in a vehicle and for allowing movement of the seat cushion assembly and the seat back assembly between a use position and a stadium position without disengaging the seat back assembly from the track assembly, wherein the stadium position is defined as the seat cushion assembly and the seat back assembly being in a substantially upright position; and wherein the track assembly includes a bottom track portion, a front top track portion, and a rear top track portion, the top track portions being slidable along the bottom track portion, the seat cushion assembly being connected to the front top track portion and the seat back assembly being connected to the rear top track portion.

2. The seat of claim 1 wherein the track assembly is configured to allow the seat cushion assembly and the seat back assembly to slide forward to allow the seat cushion assembly and the seat back assembly to be in the substantially upright position.

3. The seat of claim 1 further comprising a linkage between the seat cushion assembly and the seat back assembly, the linkage causing the seat cushion assembly to actuate into the substantially upright position with forward movement of the seat back assembly.

4. The seat of claim 1 further comprising a seat cushion lock and a rear top track portion lock, the seat cushion lock being configured to lock the seat cushion assembly in the use position, the rear top track portion lock being configured to lock the rear top track portion relative to the bottom track portion for locking the seat back assembly and thereby the seat cushion assembly in the substantially upright position if the rear top track portion is moved sufficiently forward and locked.

5. The seat of claim 1 further comprising a forward/rearward assembly associated with a rear top track portion lock to permit forward and rearward movement of the seat, the forward movement comprising the front and rear top track portions simultaneously moving forward along the bottom track portion, the rearward movement comprising the front and rear top track portions simultaneously moving rearward along the bottom track portion.

6. The seat of claim 1 further comprising a pivot assembly for pivoting the seat back assembly relative to the rear top track portion, the pivot assembly being operable to secure the seat back assembly in a kneeling position, an inclined position, a flat position, and a reclined position, the kneeling position comprising the seat back assembly being pivoted forwardly to a substantially horizontal position relative to the seat cushion, the inclined position comprising the seat back assembly being pivoted forwardly to less than the kneeling position, the flat position comprising the seat back assembly being pivoted rearwardly to a substantially horizontal position relative to the seat cushion assembly the reclined position comprising the seat back assembly being pivoted rearwardly to less than the flat position.

7. The seat of claim 1 further comprising a linkage connected to the rear top track portion and the seat cushion assembly, the linkage causing the seat cushion assembly to pivot relative to the front top track portion and into the substantially upright position with forward movement of the rear top track portion.

8. The seat of claim 7 further comprising a stadium slide assembly associated with locks on the seat cushion assembly and the rear top track portion to permit stadium positioning of the seat, actuation of the stadium slide assembly permitting forward movement of the front and rear top track portions, the bottom track portion including a stopper to limit forward movement of the front top track portion, the linkage causing the seat cushion assembly to begin pivoting only after continued forward movement of the rear top track portion after the front top track portion contacts the stopper.

9. The seat of claim 8 further comprising a spring secured at one end to the front top track portion and secured at another end to a front of the bottom track portion, the spring tending to pull the front top track portion toward the front of the bottom track portion, the spring providing initial biasing to move the rear top track portion forward in response to actuation of the stadium slide assembly for moving the seat into the stadium position.

10. The seat of claim 9 wherein the spring restrains the front top track portion in a forward position relative to the stopper during actuation of the stadium slide assembly for moving the seat from the stadium position to the use position such that rearward movement of the rear top track portion causes the linkage to pivot the seat cushion assembly from the upright position to the use position in which the seat cushion assembly is in a substantially horizontal position.

11. A second row seat system for use with an automotive vehicle, the second row seat system comprising:
  a seat cushion assembly;
  a seat back assembly;
  a linkage connected to the seat cushion assembly; and
  a track assembly for supporting the seat cushion assembly and the seat back assembly in the vehicle and for allowing sliding movement of the seat back assembly to cause the linkage to move the seat cushion assembly between a use position and a stadium position, the stadium position including the seat cushion assembly and the seat back assembly each positioned in a substantially upright position at a forward position of the track assembly.

12. A second row seating system for use with an automotive vehicle, the system comprising:
  a second row seat comprising a seat cushion assembly and a seat back assembly;
  a track assembly for supporting the seat cushion assembly and the seat back assembly in the vehicle and for allowing movement of the seat cushion assembly and the seat back assembly between a use position and a stadium position without disengaging the seat back assembly from the track assembly wherein the stadium position is defined as the seat cushion assembly and the seat back assembly being in a substantially upright position at a forward position of the track assembly to provide access to an area of the vehicle behind the second row seat; and
  a linkage between the seat cushion assembly and the seat back assembly, the linkage causing the seat cushion assembly to actuate into the substantially upright position with forward movement of the seat back assembly.

13. The system of claim 12 wherein the track assembly includes a bottom track portion, a front top track portion, and a rear top track portion, the top track portions being slidable along the bottom track portion to allow the stadium positioning, the seat cushion assembly being connected to the front top track portion and the sear back assembly being connected to the rear top track portion.

14. The system of claim 13 further comprising a pivot assembly for pivoting the seat back assembly relative to the rear top track portion, the pivot assembly being operable to secure the seat back assembly in a kneeling position, an inclined position, a flat position, and a reclined position, the kneeling position comprising the seat back assembly being pivoted forwardly to a substantially horizontal position relative to the seat cushion assembly, the inclined position comprising the seat back assembly being pivoted forwardly to less than the kneeling position, the flat position comprising the seat back assembly being pivoted rearwardly to a substantially horizontal position relative to the seat cushion assembly, the reclined position comprising the seat back assembly being pivoted rearwardly to less than the flat position.

15. The system of claim 13 further comprising a forward/rearward assembly associated with a rear top track portion lock to permit forward and rearward movement of the seat, the forward movement comprising the front and rear top track portions simultaneously moving forward along the bottom track portion, the rearward movement comprising the front and rear top track portions simultaneously moving rearward along the bottom track portion.

16. The system of claim 13 further comprising said linkage connected to the rear top track portion and the seat cushion assembly, the linkage causing the seat cushion assembly to pivot relative to the front top track portion and into the upright position with forward movement of the rear top track portion.

17. The system of claim 16 further comprising a stadium slide assembly associated with locks on the seat cushion assembly and the rear top track portion to permit stadium positioning of the seat, actuation of the stadium slide assembly permitting forward movement of the front and rear top track portions, the bottom track portion including a stopper to limit forward movement of the front top track portion, the linkage causing the seat cushion assembly to begin pivoting only after continued forward movement of the rear top track portion after the front top track portion contacts the stopper.

18. The system of claim 17 further comprising a spring secured at one end to the front top track portion and secured at another end to a front of the bottom track portion, the spring tending to pull the front top track portion toward the front of the bottom track portion, the spring providing initial biasing to move the rear top track portion forward in response to actuation of the stadium slide assembly for moving the seat back assembly and the seat cushion assembly into the stadium position, the spring also restraining the front top track portion in a forward position relative to the stopper during actuation of the stadium slide assembly for moving the seat back assembly and the seat cushion assembly from the stadium position to the use position such that rearward movement of the rear top track portion causes the linkage to pivot the seat cushion assembly from the upright position to the use position in which the seat cushion assembly is in a substantially horizontal position.

* * * * *

UNITED STATES PATENT AND TRADEMARK OFFICE
CERTIFICATE OF CORRECTION

PATENT NO. : 6,899,392 B1
DATED : May 31, 2005
INVENTOR(S) : Mohammad Saberan et al.

It is certified that error appears in the above-identified patent and that said Letters Patent is hereby corrected as shown below:

Column 6,
Line 54, delete "sear" and insert -- seat --.

Signed and Sealed this

Ninth Day of August, 2005

JON W. DUDAS
*Director of the United States Patent and Trademark Office*